United States Patent
Beilin et al.

(10) Patent No.: US 10,326,643 B2
(45) Date of Patent: Jun. 18, 2019

(54) SELF-CONFIGURING FAULT-TOLERANT OPERATIONAL GROUP

(71) Applicant: The Charles Stark Draper Laboratory, Inc., Cambridge, MA (US)

(72) Inventors: Samuel Beilin, Brighton, MA (US); Seamus Tuohy, Newton, MA (US)

(73) Assignee: The Charles Stark Draper Laboratory, Inc., Cambridge, MA (US)

(*) Notice: Subject to any disclaimer, the term of this patent is extended or adjusted under 35 U.S.C. 154(b) by 40 days.

(21) Appl. No.: 15/391,023

(22) Filed: Dec. 27, 2016

(65) Prior Publication Data
US 2018/0183657 A1  Jun. 28, 2018

(51) Int. Cl.
*H04L 12/24* (2006.01)
*H04L 12/26* (2006.01)

(52) U.S. Cl.
CPC ......... *H04L 41/0681* (2013.01); *H04L 43/10* (2013.01); *H04L 41/0876* (2013.01); *H04L 41/0893* (2013.01)

(58) Field of Classification Search
None
See application file for complete search history.

(56) References Cited

U.S. PATENT DOCUMENTS

| | | | |
|---|---|---|---|
| 4,015,246 A | 3/1977 | Hopkins, Jr. et al. | |
| 4,665,522 A | 5/1987 | Lala et al. | |
| 4,907,232 A | 3/1990 | Harper et al. | |
| 4,937,741 A | 6/1990 | Harper et al. | |
| 5,210,871 A | 5/1993 | Lala et al. | |
| 5,537,583 A | 7/1996 | Truong | |
| 6,018,812 A | 1/2000 | Deyst, Jr. et al. | |
| 6,970,045 B1 | 11/2005 | Lichter et al. | |
| 7,383,474 B2 | 6/2008 | Sekizawa | |
| 8,150,800 B2 | 4/2012 | Webman et al. | |
| 8,964,625 B2 * | 2/2015 | Cemper | H04W 40/20 370/248 |
| 8,972,772 B2 | 3/2015 | Beilin et al. | |

(Continued)

FOREIGN PATENT DOCUMENTS

| | | |
|---|---|---|
| EP | 2 085 839 | 8/2009 |
| EP | 2 953 295 | 12/2015 |
| WO | WO 2010/048048 | 4/2010 |

OTHER PUBLICATIONS

International Search Report and Written Opinion for PCT/US2016/068686 dated Sep. 12, 2017 entitled "Self-Configuring Fault-Tolerant Operational Group".

(Continued)

*Primary Examiner* — Anh Ngoc M Nguyen
(74) *Attorney, Agent, or Firm* — Hamilton, Brook, Smith & Reynolds, P.C.

(57) ABSTRACT

In an embodiment, a method includes assigning, based on a switch module of a particular node of one or more nodes of a fault-tolerant group, a channel to the particular node. The method further includes determining a number of nodes in the fault-tolerant group by exchanging handshake information between the channel assigned to the particular node and channels assigned to other nodes of the fault-tolerant group. The method further includes initializing the fault-tolerant group with the determined number of nodes based on the exchanged handshake information.

20 Claims, 12 Drawing Sheets

(56) References Cited

U.S. PATENT DOCUMENTS

| | | | |
|---|---|---|---|
| 9,817,741 | B2 | 11/2017 | Mucke |
| 2003/0158936 | A1 | 8/2003 | Knop |
| 2004/0167912 | A1 | 8/2004 | Tsui |
| 2008/0040628 | A1 | 2/2008 | Mandal |
| 2009/0106606 | A1 | 4/2009 | Duan et al. |
| 2013/0297847 | A1 | 11/2013 | Koritnik et al. |
| 2014/0033215 | A1* | 1/2014 | Otomo .................... G06F 9/505 718/102 |
| 2014/0043962 | A1 | 2/2014 | Rangan |
| 2014/0281079 | A1 | 9/2014 | Biskup |
| 2015/0271103 | A1* | 9/2015 | Thayalan ................ H04L 49/25 370/217 |
| 2016/0050123 | A1* | 2/2016 | Nishanov ............ H04L 41/5003 709/223 |
| 2016/0321147 | A1 | 11/2016 | Kizhakkiniyil |
| 2017/0155586 | A1 | 6/2017 | Shu |
| 2018/0176107 | A1 | 6/2018 | Beilin |

OTHER PUBLICATIONS

International Search Report and Written Opinion of PCT/US2016/066862 dated May 31, 2017 entitled "Fault-Tolerant Operational Group On A Distributed Network".

Kvaser, "The CAN Protocol Tour—CAN Error Handling", https://www.kvaser.com/about-can/the-can-protocol/can-error-handling—retrieved from Internet Sep. 9, 2016

Di Natale, M., "Understanding and Using the Controller Area Network" *Handout of a lecture at UC Berkeley*. Oct. 30, 2008.

Almeida, L., "Safety-critical automotive systems: New developments in CAN", Electronics Systems Lab, University of Aveiro Portugal, http://www.artist-embedded.org retrieved from Internet Mar. 15, 2017.

Navet, N., et al. "Fault Tolerant Services for Safe In-Car Embedded Systems" Oct. 26, 2004..

NHTSA, US Department of Transportation, "Accelerating the Next Revolution in Roadway Safety", Sep. 2016.

Navet, N., et al., "Automotive Embedded Systems Handbook", Industrial Information Technology Series, 2009.

International Standard, "Road Vehicles—Controller Area Network" Part 1: Data Link Layer and Physical Signalling, ISO 11898-1, Second Edition, Dec. 15, 2016.

International Standard, "Road Vehicles—Controller Area Network" Part 2: High-Speed Medium Access Unit, ISO 11898-2, Second Edition, Dec. 15, 2016.

International Standard, "Road Vehicles—Controller Area Network" Part 1: Low-Speed, Fault-Tolerant, Medium-Dependent Interface, ISO 11898-3, First Edition, Jun. 1, 2006.

* cited by examiner

SELF-CONFIGURING FAULT-TOLERANT OPERATIONAL GROUP

BACKGROUND

With the rapid technological developments in areas such as aviation, space travel, robotics, autonomous vehicles, medical devices, and electronic financial systems, there is an increasing need for computer systems to be reliable and resilient to failure. Thus, there is an ever growing demand for reliable computing systems. Replicated computers executing identical operations can provide fault tolerance by comparing the outputs of each of the computers and determining which one of the computers may have generated an error during operation.

SUMMARY

In an embodiment, a method includes assigning, based on a switch module of a particular node of one or more nodes of a fault-tolerant group, a channel to the particular node. The method further includes determining a number of nodes in the fault-tolerant group by exchanging handshake information between the channel assigned to the particular node and channels assigned to other nodes of the fault-tolerant group. The method further includes initializing the fault-tolerant group with the determined number of nodes based on the exchanged handshake information.

In an embodiment, determining the number of nodes in the fault-tolerant group is set by one or more switches of the switch module.

In an embodiment, exchanging handshake information further includes sending one or more messages from the channel from the particular node to the channel of a second node of the fault tolerant group. The method further includes, if a response to the messages is received at the particular node, marking the channel as active. The method further includes determining the level of fault-tolerance based on the number of nodes in the fault-tolerant group. Determining the level of fault-tolerance may be further based on determining a number of nodes operatively connected to the one or more nodes through the channels marked as active.

The method can further include presenting, to a user, the level of fault-tolerance for approval.

In an embodiment, determining the number of nodes in the fault-tolerant group includes receiving termination signals along one or more unused channels, and determining the number of nodes in the fault-tolerant group to be the number of nodes that receive signals other than the termination signal. The one or more channels may correspond with ports, and the one or more channels may be in a sequential order. The method may further include providing the one or more termination signals by connecting a termination device to one of the ports.

In an embodiment, providing the one or more termination signals may include providing a termination signal at one of the ports, and determining the number of nodes in the fault-tolerant group may include determining the number of nodes corresponding to channels before the termination device in reference to the sequential order of the ports.

In an embodiment, providing the termination signals may provide a termination signal at any unused port, and determining the number of nodes in the fault-tolerant group may determine the number of nodes corresponding to channels disconnected from the termination device.

In an embodiment, a system includes a fault-tolerant group having one or more nodes. The system further includes a switch module of a particular node of the nodes configured to assign a channel to the particular node. The fault-tolerant group is further configured to automatically self-configure by determining a number of nodes in the fault-tolerant group by exchanging handshake information between the channel assigned to the particular node and channels assigned to other nodes of the fault-tolerant group, and initializing the fault-tolerant group with the determined number of nodes based on the exchanged handshake information.

In an embodiment, a non-transitory computer-readable medium is configured to store instructions for a fault-tolerant group. The instructions, when loaded and executed by a processor, causes the processor to assign, based on a switch module of a particular node of one or more nodes of a fault-tolerant group, a channel to the particular node, and automatically self-configure the fault tolerant group by determining a number of nodes in the fault-tolerant group by exchanging handshake information between the channel assigned to the particular node and channels assigned to other nodes of the fault-tolerant group, and initializing the fault-tolerant group with the determined number of nodes based on the exchanged handshake information.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of example embodiments of the invention follows.

Previous methods of implementing fault-tolerance employ nodes that are directly connected to each other. Each node independently performs the same function, and for each operation, results are compared and voted on by the other system. In voting, when there is a difference in the results, a failure can be overridden by the correctly calculated answer found by a majority of the nodes, or if there is not a majority, failure can be flagged. These previous methods of implementing fault-tolerance require reprogramming of the nodes making up the fault-tolerant operational group to implement the desired level of fault-tolerance.

In general, fault-tolerant operational groups are referred to by the number of backup systems employed. For example, a simplex is an operational group with one node, and a duplex is an operational group with two nodes. Both simplex and duplex operational groups are zero-fault-tolerant. A simplex does not have another node to check results against, and while a duplex can check each node against each other, in the case of a fault, the nodes cannot agree on which node is correct. However, the duplex can note the error, and other corrective actions can be taken, such as cancelling a launch or other operation. A one-fault-tolerant operational group is a triplex, which has three nodes. A two-fault-tolerant operational group is a quad, or quadraplex. In general, the number of nodes in an operational group is given by the formula $m=n+2$, where m is the number of nodes and n is the desired level of tolerance. A person of ordinary skill in the art can envision higher level fault-tolerant operational groups according to this formula. In these methods, each node was connected to all other nodes directly. For example, a duplex would have two lines—one from the first node to the second, and one from the second to the first. For higher-level fault-tolerant operational groups, however, many more connections are needed. For example, in a triplex, six wires are needed. In a quad, 12 wires are needed. A similar system is described in U.S. Pat. No. 8,972,772, "System and Method for Duplexed Replicated Computing," by Beilin et al. (hereinafter "the '772 Patent"), which is herein incorporated in reference in its entirety.

However, when nodes of a fault-tolerant operational group have to be reprogrammed to adjust the level of fault-tolerance within the operational group, systems can include extraneous computer systems. Accordingly, in an embodiment of the present invention, a system, method, and non-transitory computer readable medium are provided for a self-realizing fault-tolerant operational group that auto-configures based on the number of connected nodes. With such a system, components can be designed without a specific level of fault-tolerance. Instead, the fault-tolerance can be abstracted away into the self-realizing layer. Nodes can, therefore, be repurposed as a simplex, a duplex, a triplex, or a quad based on their connections, in an embodiment of the present invention. In this way, nodes are not wasted in over-specified machines, such as four nodes being in a machine that has only zero fault-tolerance.

Figure 1A:
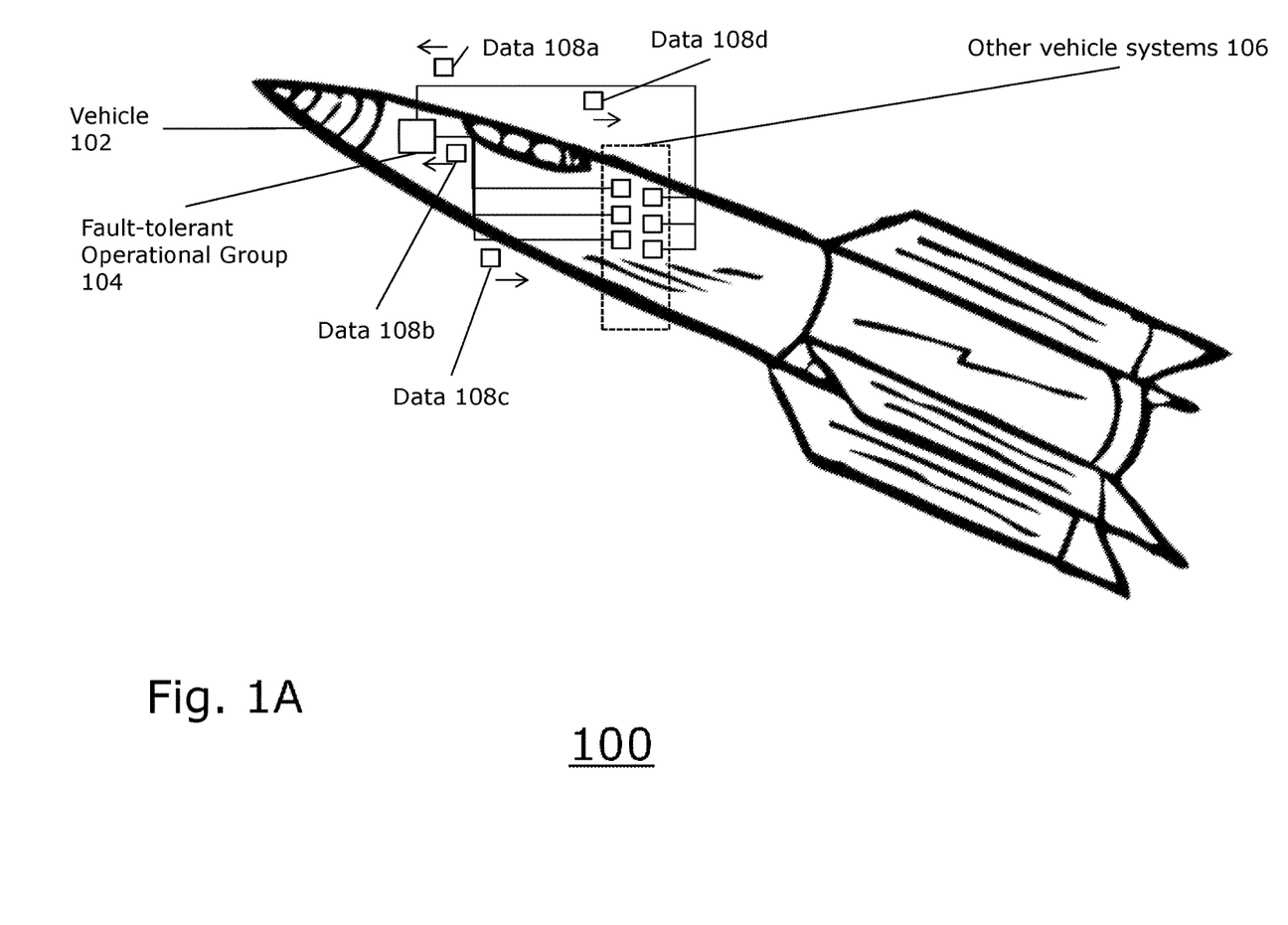
FIG. 1A is a diagram illustrating an example embodiment of the present invention.

FIG. 1A is a diagram 100 illustrating an example embodiment of the present invention. A vehicle 102, such as a plane, automated vehicle, or spacecraft, includes a fault-tolerant operational group 104. A person of ordinary skill in the art can recognize that the fault-tolerant operational group 104 can be inside of any other fault-tolerant system. The vehicle 102, like any fault-tolerant system, includes multiple systems assistant with its operation, such as flight computers, GPS systems, and the like. Each of these communicates with each other, and relies on accurate data from the other systems. To this end, each system can be part of a fault-tolerant operational group 104, that ensures accuracy to a desired level of fault-tolerance. In embodiments of the present invention, each system can be configured to its own level of fault-tolerance. Each system is agnostic to the other vehicle systems 106 level of fault-tolerance, but a correct assigning of fault-tolerance levels ensures correct data flow among the vehicle's systems, and that the vehicle 102 is fault-tolerant to its desired level. The fault-tolerant operational group includes one or more nodes configured to carry out parallel calculations, compare the calculations, and vote on a correct solution. When a solution is divergent from the other nodes, the node that calculated the divergent solution can be taken out of service, and the correct result can be used in one-fault and two-fault tolerant operational groups.

A fault-tolerant operational group 104, therefore, receives data 108a-b from other vehicle systems 106, and further sends data 108-cd to other vehicle systems 106. The fault-tolerant operational group 104 is not necessarily informed of the fault-tolerance of the other vehicle systems 106, but assumes the accuracy of the received data 108a-b. Likewise, the other vehicle systems 106 may be unaware of the fault-tolerance level of the fault-tolerant operational group 104, but assumes the data 108c-d is accurate.

Figure 1B:
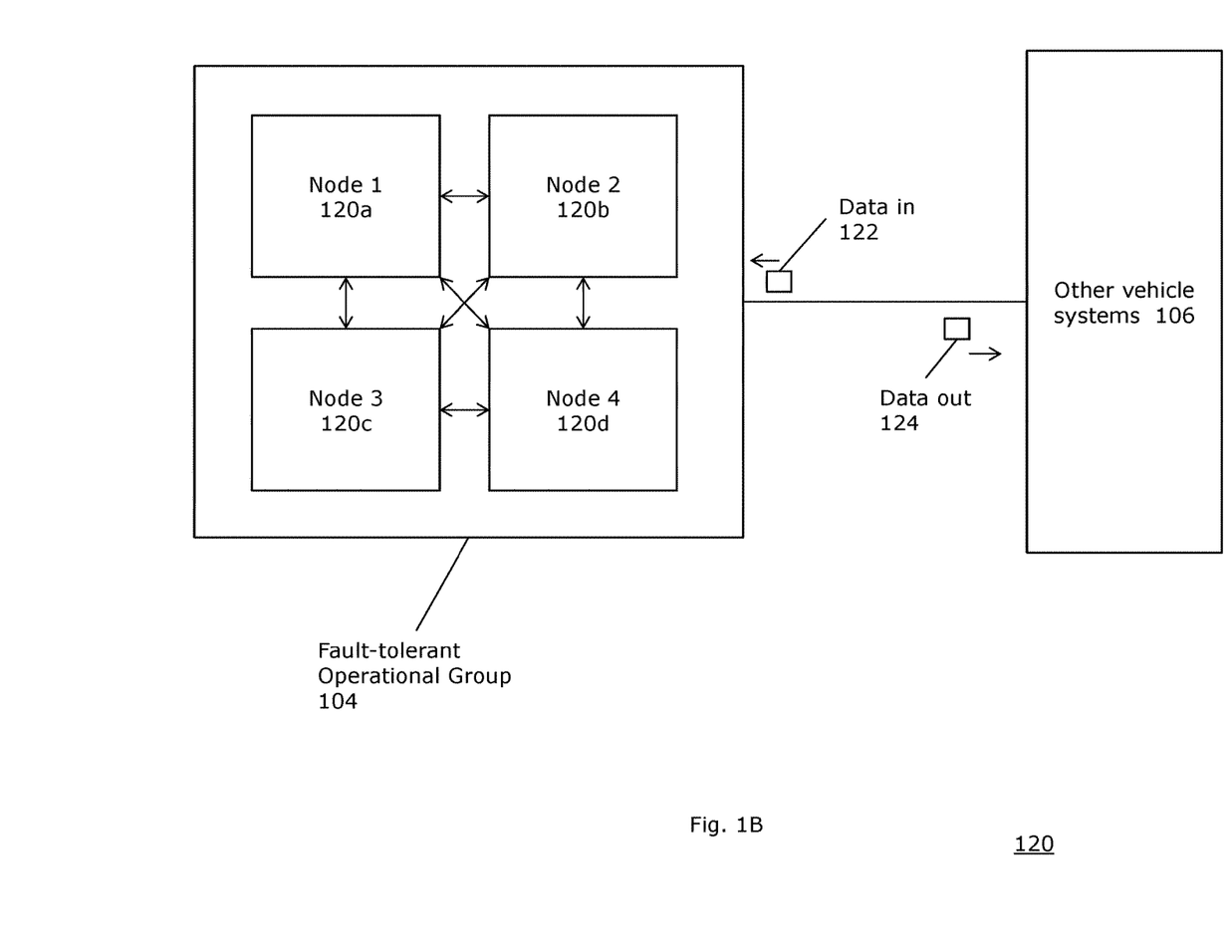
FIG. 1B is a diagram illustrating an example embodiment of the fault-tolerant operational group.

FIG. 1B is a diagram 120 illustrating an example embodiment of the fault-tolerant operational group 104. The fault-tolerant operational group 104 includes four nodes: Node 1 120a, Node 2 120b, Node 3 120c, and Node 4 120d. Nodes 1-4 120a-d are operatively coupled by six two-way communication channels, or alternatively 12 one-way communication channels to form a quad or two-fault tolerant operational group. Each operation performed by the fault-tolerant operational group 104 is performed by Nodes 1-4 120a-d, and the results are compared. The fault-tolerant operational group 104 of FIG. 1B may have many as two of the nodes have a fault, and can still present an accurate result with the other two nodes being in agreement. The fault-tolerant operational group 104 receives data in 122 from other vehicle systems 106, which can trigger operations or be input as data for its operations. After verification, the fault-tolerant operational group outputs data out 124 to the other vehicle systems 106 with a fault-tolerant answer.

In previous configurations of fault-tolerant operational groups, each node is designed to communicate with a set number of other nodes. For example, in the quad illustrated in FIG. 1B, each node 120a-d is designed to work only with a quad and be connected to three other machines. The system cannot be downscaled to a triplex, duplex, simplex, or upscaled to a higher level of fault-tolerance. Such a set up can drive up costs of systems needing the same features of the fault-tolerance operational group 104. For example, a customer building a drone may wish to purchase a fault-tolerant component for the drone, which needs to be one-fault tolerant, and therefore, require a triplex. However, a supplier may build the component only for a two-fault tolerant system that is specified for human flight, in one example. In this example, the customer has to pay additional money for a fourth node that the drone does not need because the customer has to buy the entire quad. In another example, a supplier may build the component for zero fault-tolerance. In this case, a new fault-tolerant operational group needs to be made from scratch, because the zero fault-tolerant operational group cannot be customized to be one-fault tolerant. Therefore, it is desirable to build nodes that can be connected to other nodes at a custom level of fault-tolerance.

Figure 1C:
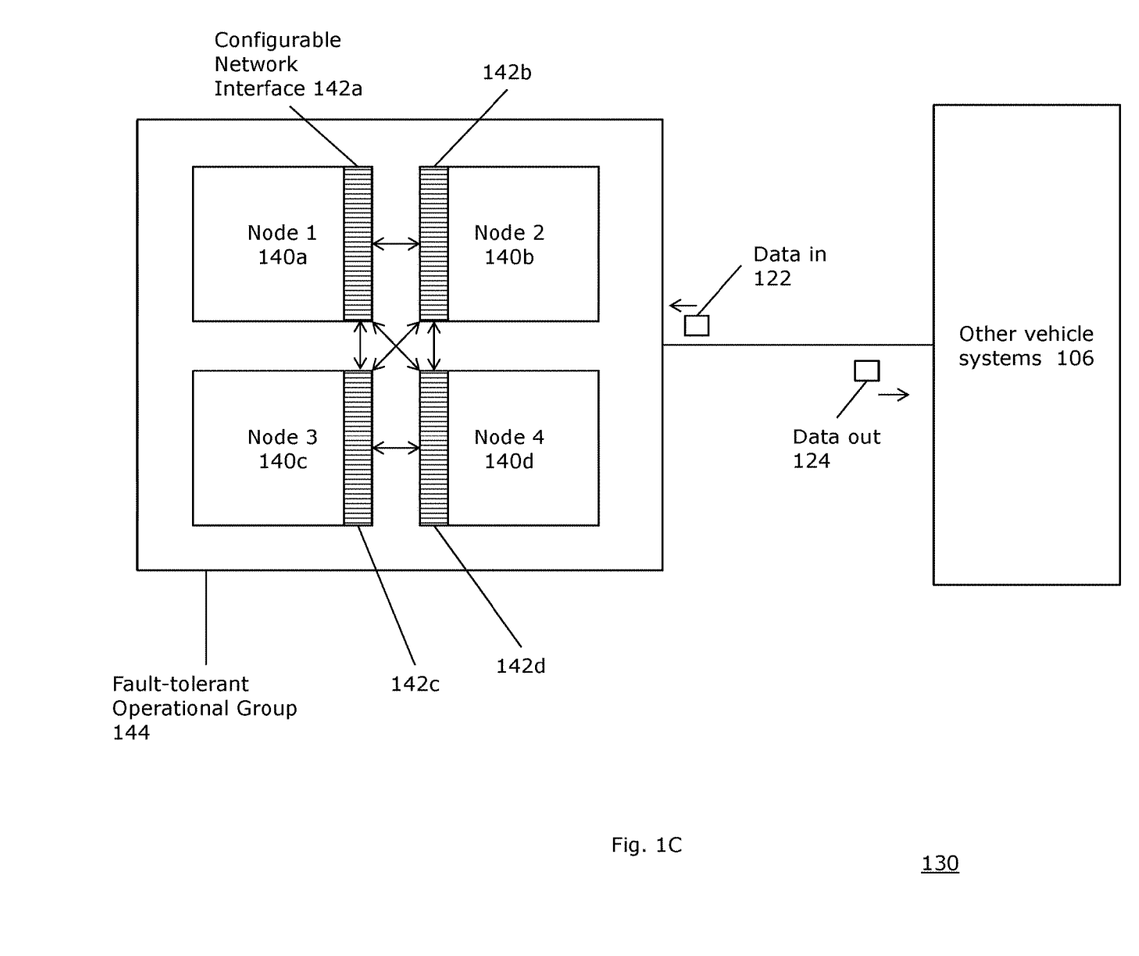
FIG. 1C is a diagram illustrating an example embodiment of a configurable network interface coupled to each node.

FIG. 1C is a diagram 130 illustrating an example embodiment of a configurable network interface 142a-d coupled to each node 140a-d. The configurable network interfaces 142*a-d* allows customized configurations of fault-tolerant operational groups 104. Instead of the fault-tolerant operational group 104 of FIGS. 1A-1B which are configured to only have one level of fault-tolerance, the fault-tolerant operational group 144 of FIG. 1C provides a configurable network interface 142*a-d* for each node 140*a-d*. The fault-tolerant operational group 144 can have any number of nodes 120*a-d* connected to form any level of fault-tolerant grouping. Other vehicle systems 106 continue to send data in 122 and receive data out 124, agnostic of the configuration of the configurable network interfaces 142*a-d* of the fault-tolerant operational group 104.

Figure 2:
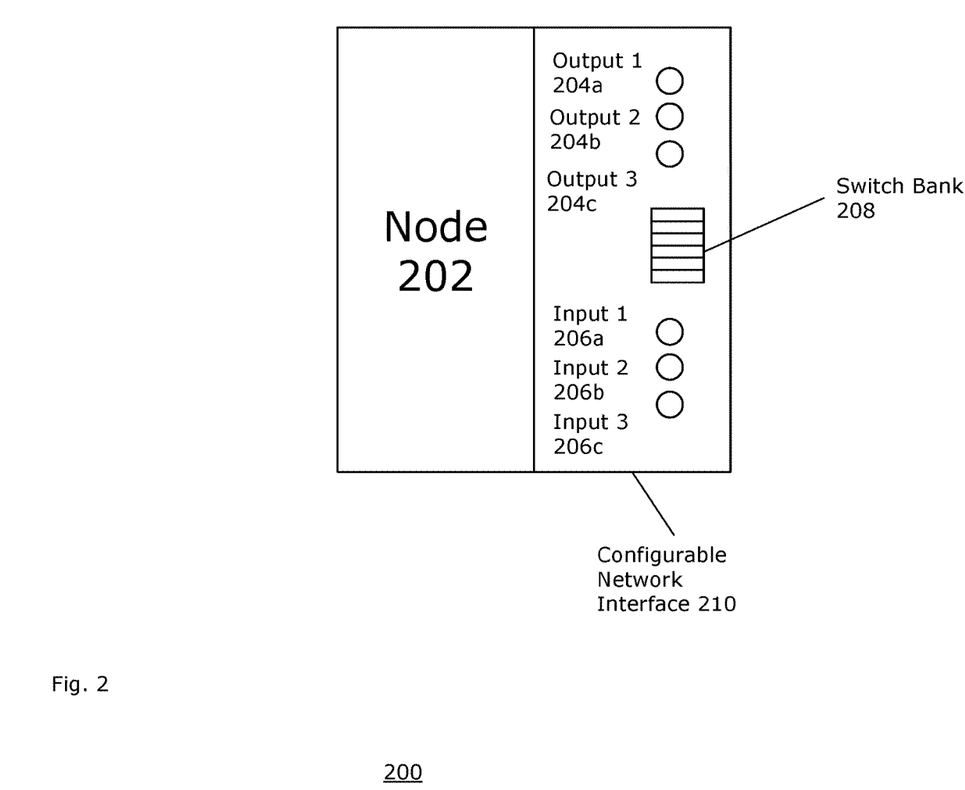
FIG. 2 is a block diagram of a node employed by an example embodiment of the present invention.

FIG. 2 is a block diagram 200 of a node 202 employed by an example embodiment of the present invention. The node includes, or is operatively coupled to, a configurable network interface 210. The configurable network interface includes a plurality of input ports 206*a-c* and output ports 204*a-c*. The ports can be standards such as RJ-45, optical ports, or any other communication port. Each node further includes a switch bank 208. The switch bank 208 includes switches that can indicate either (a) how many nodes are in the fault-tolerant operational group and (b) a channel assigned to the node. For example, in a system allowing up to two-fault tolerance, and therefore, a quad, two switches are needed for determining the number of nodes necessary (e.g., $\log_2$(number of desired nodes)), and two switches are needed to determine the channel (e.g., $\log_2$(number of desired nodes)).

Each respective input port 206*a-c* and output port 204*a-c* are assigned to specific nodes. In particular, input ports 206*a-c* and output ports 204*a-c* are labeled so that a person configuring the fault-tolerant operational group can ensure the same node is corrected to the correct ports for input and output. In an embodiment, the ports can be color coded to assist designers in connecting nodes correctly.

Figure 3:
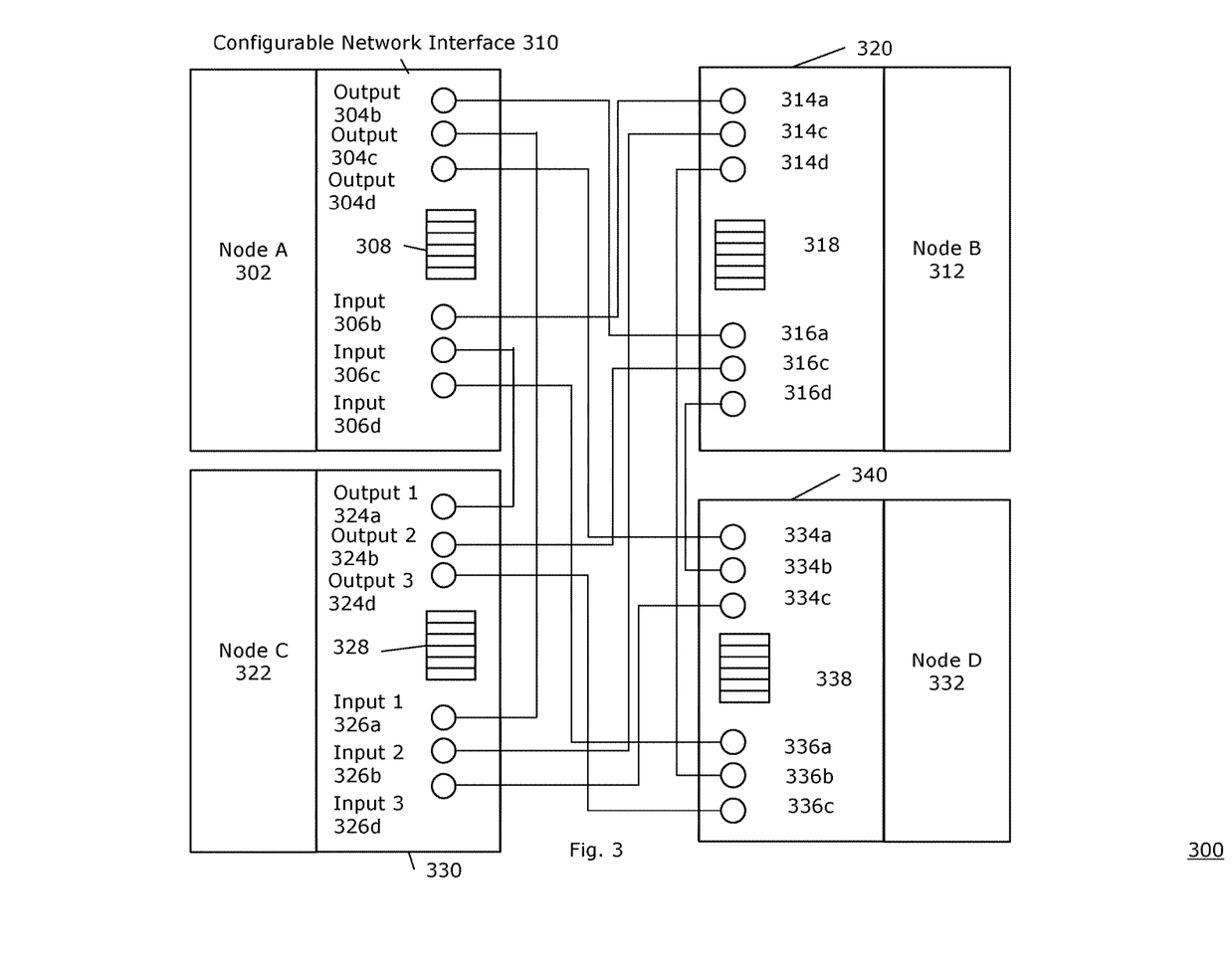
FIG. 3 is a diagram illustrating an example embodiment of a quad using the configurable interface of the present invention.

FIG. 3 is a diagram 300 illustrating an example embodiment of a quad using the configurable interface of the present invention. Each node (e.g., Node A 302, Node B 312, Node C 322, and Node D 332) is operatively coupled to each of the respective other nodes. An initialization method can confirm that each node is connected and operating, and the fault-tolerant operational group including the nodes (e.g., Node A 302, Node B 312, Node C 322, and Node D 332) can then self-realize that it is a quad. Each switch bank also self-identifies its channel. For example, the switch bank 308 of Node A 302 identifies as the first channel, 0 0, the switch bank 318 of Node B 312 identifies as the second channel 0 1, the switch bank 328 of Node C 322 identifies as the third channel 1 0, and the switch bank 338 of Node D 332 identifies as the fourth channel 1 1.

In an optional embodiment, the switch banks can assist with the self-configuration of level of fault-tolerance. For example, the fault-tolerance level of the switch banks 308, 318, 328, and 338, having two switches, can be a simplex (e.g., 0 0), a duplex (e.g., 0 1), a triplex (e.g., 1 0), or a quad (e.g., 1 1). However, because of the configurable network interfaces 310, 320, 330 and 340, the system can be configured to other fault-tolerances, with fewer machines.

Accordingly, in another embodiment, the switch bank(s) 308, 318, 328, and 338 can be removed, where channel identification is assigned by firmware, by loading a channel identification stored in memory, or by a hard wiring the signals on the backplane (e.g., via a resistor to ground, short to ground, resistor to voltage, or a short to voltage) or the node itself (e.g., via a resistor to ground, short to ground, resistor to voltage, or a short to voltage). In such an embodiment, the nodes can self-configure the level of fault-tolerance without using the switch banks, and such, the system can operate without the switch banks. A switch module can perform the above described function of the switch bank(s) 308, 318, 328, and 338, or assign channel identification via firmware, load channel identification stored in a memory, or determine channel identification through hard wired signals on the backplane (e.g., via a resistor to ground, short to ground, resistor to voltage, or a short to voltage) or the node itself (e.g., via a resistor to ground, short to ground, resistor to voltage, or a short to voltage).

The initialization sequence at a particular node sends several test messages to each other node and verifies a working communication channel from the particular node to each other node by receiving successful acknowledgements of the test messages. If all lines are active, the system can self-realize as a quad. If one of the nodes is not properly communicating, then the system can self-realize without that node. For example, if Node D 332 is not functioning properly and does not respond to the test messages in the expected manner, Node D is excluded from the formed fault-tolerant operational group.

In addition, a person of ordinary skill in the art can configure each node with two-way communication wires, such that six wires, instead of the 12 shown in FIG. 3, are used in the case of a quad.

Figure 4:
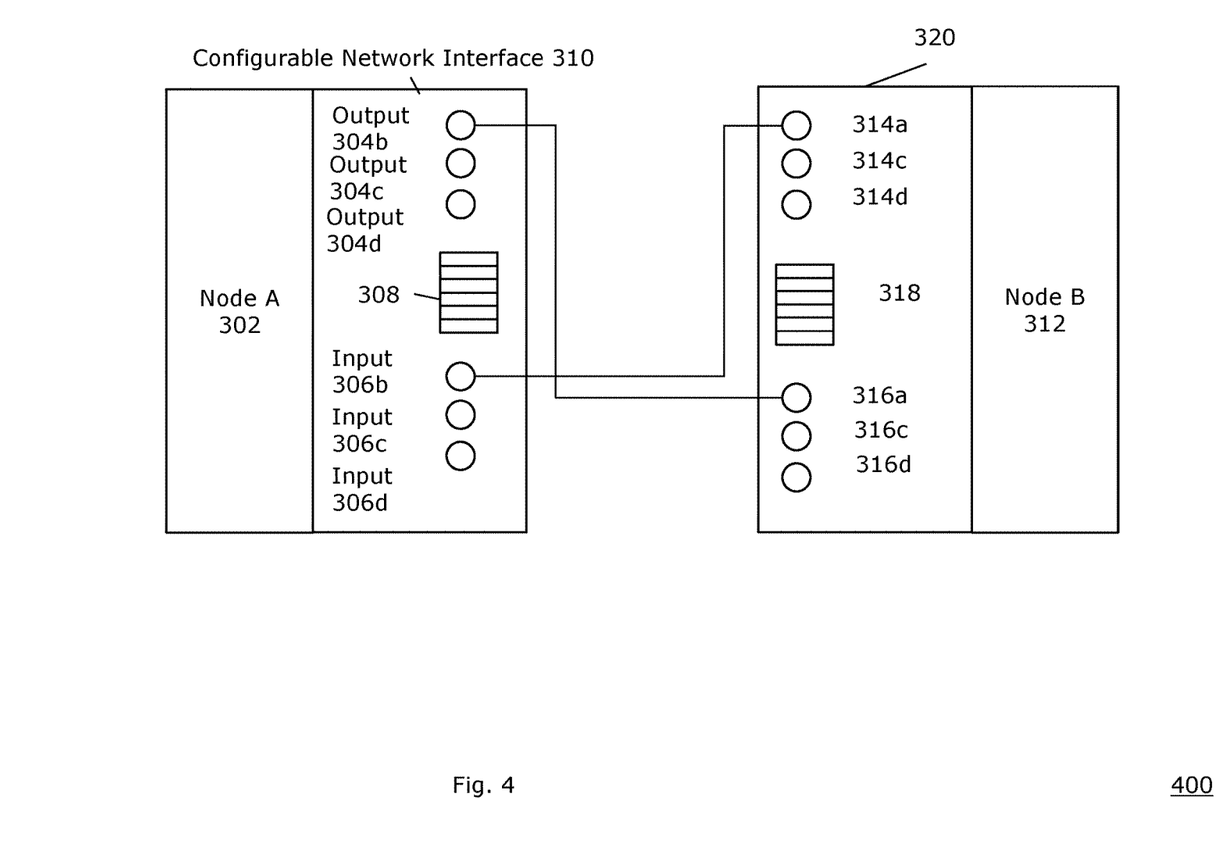
FIG. 4 is a diagram illustrating an example embodiment of a duplex using the configurable interface of the present invention.

FIG. 4 is a diagram 400 illustrating an example embodiment of a duplex using the configurable interface of the present invention. The same Node A 302 and Node B 312 can be used to form a duplex, instead of the quad shown in FIG. 3. In relation to FIG. 4, Node A 302 and Node B 312 are the same nodes with the same respective configurable network interfaces 310 and 320. However, the only change is that the wires connecting the other devices are removed, and the switch bank 308 and 318 settings are changed. The switch bank, in an embodiment, is set to a duplex (e.g., 0 1), but each channel assignment can be set to be the same as the quad configuration, above.

In an embodiment, the nodes search for other nodes in a sequential order. In this embodiment, nodes are expected to be connected from the lowest numbered port channel to the highest. In this embodiment, the initialization sequence can terminate searching for additional nodes after receiving the termination signal because the expectation is that after any empty port, either without the termination signal or with it, that there are no more active nodes. After reaching an empty port, the nodes stop searching for additional ports, in this embodiment.

In another embodiment, the nodes confirm connections on all ports. In this embodiment, each node sends out messages on all ports. Nodes that have sent and received acknowledgements by all other nodes are considered an active node of the fault-tolerant group. Nodes that have not sent and received acknowledgements by all other groups are considered non-existent, connected improperly, or non-existent, and are not considered part of the fault-tolerant group.

Figure 5:
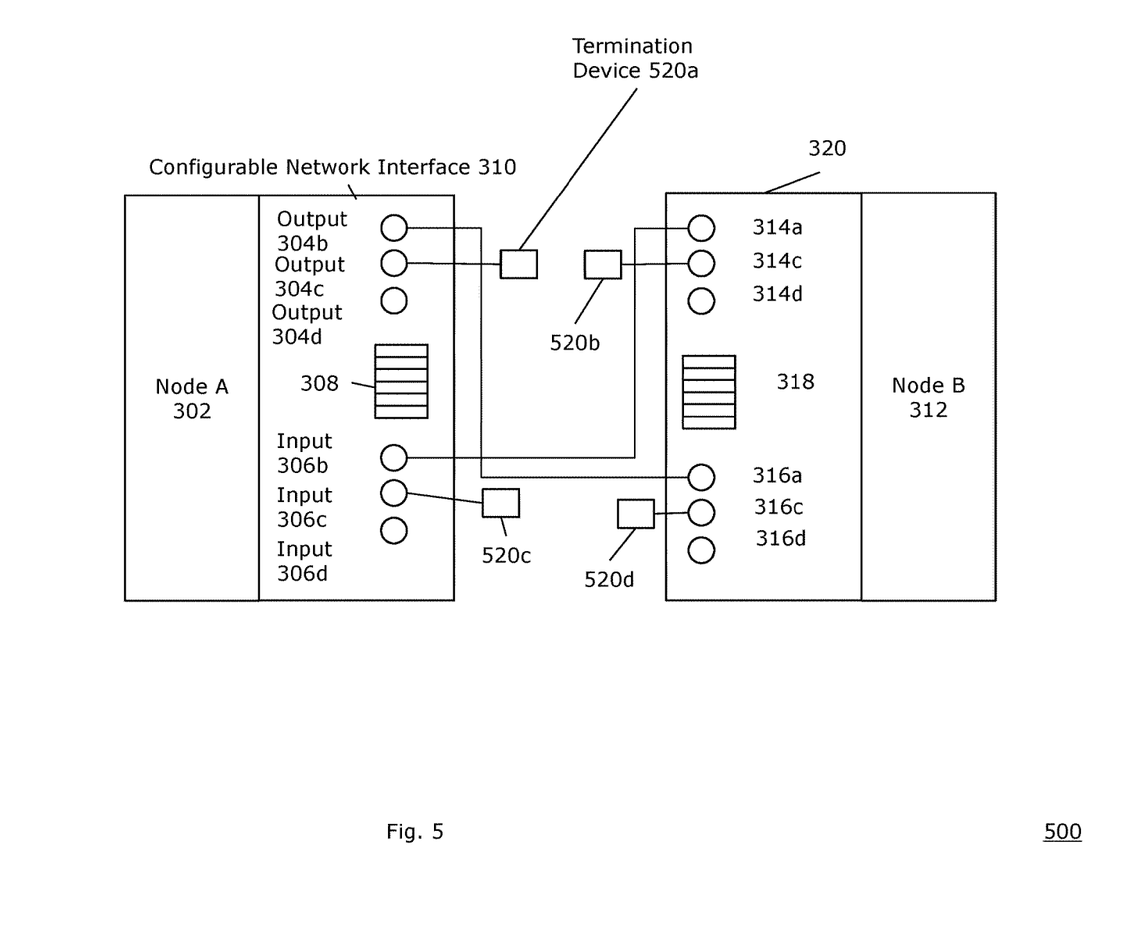
FIG. 5 is a diagram illustrating an example embodiment of a duplex and termination devices using the configurable interface of the present invention.

FIG. 5 is a diagram 500 illustrating an example embodiment of a duplex and termination devices using the configurable interface of the present invention. While the system of FIG. 4 can auto-determine that the outputs 304*c-d*, 314*c-d*, and inputs 306*c-d* and 316*c-d* are not connected to a device, a termination device 520*a* can provide a signal to the respective node 302, 312 that sends a signal indicating the particular port is not active. In an embodiment, the nodes search for other nodes in a sequential order. In this embodiment, nodes are expected to be connected from the lowest numbered port channel to the highest. In this embodiment, the initialization sequence can terminate searching for additional nodes after receiving the termination signal because the expectation is that after any empty port, either without the termination signal or with it, that there are no more active nodes.

In another embodiment, the nodes confirm connections on all ports. In this embodiment, each node sends out messages on all ports. Nodes that have sent and received acknowledgements by all other nodes are considered an active node of the fault-tolerant group. Nodes that have not sent and received acknowledgements by all other groups are considered non-existent, connected improperly, or non-existent, and are not considered part of the fault-tolerant group. In other words, in this embodiment, nodes check for other nodes in ports after receiving a termination signal.

The termination devices 520*a-d* also serve a secondary purpose by blocking dirt and debris from collecting in the unused ports. Therefore, the termination devices 520 can be connected in all unused ports to preserve the life of the ports. In further embodiments, the termination devices 520 are enabled to perform foreign object detection (FOD) as well.

Figure 6:
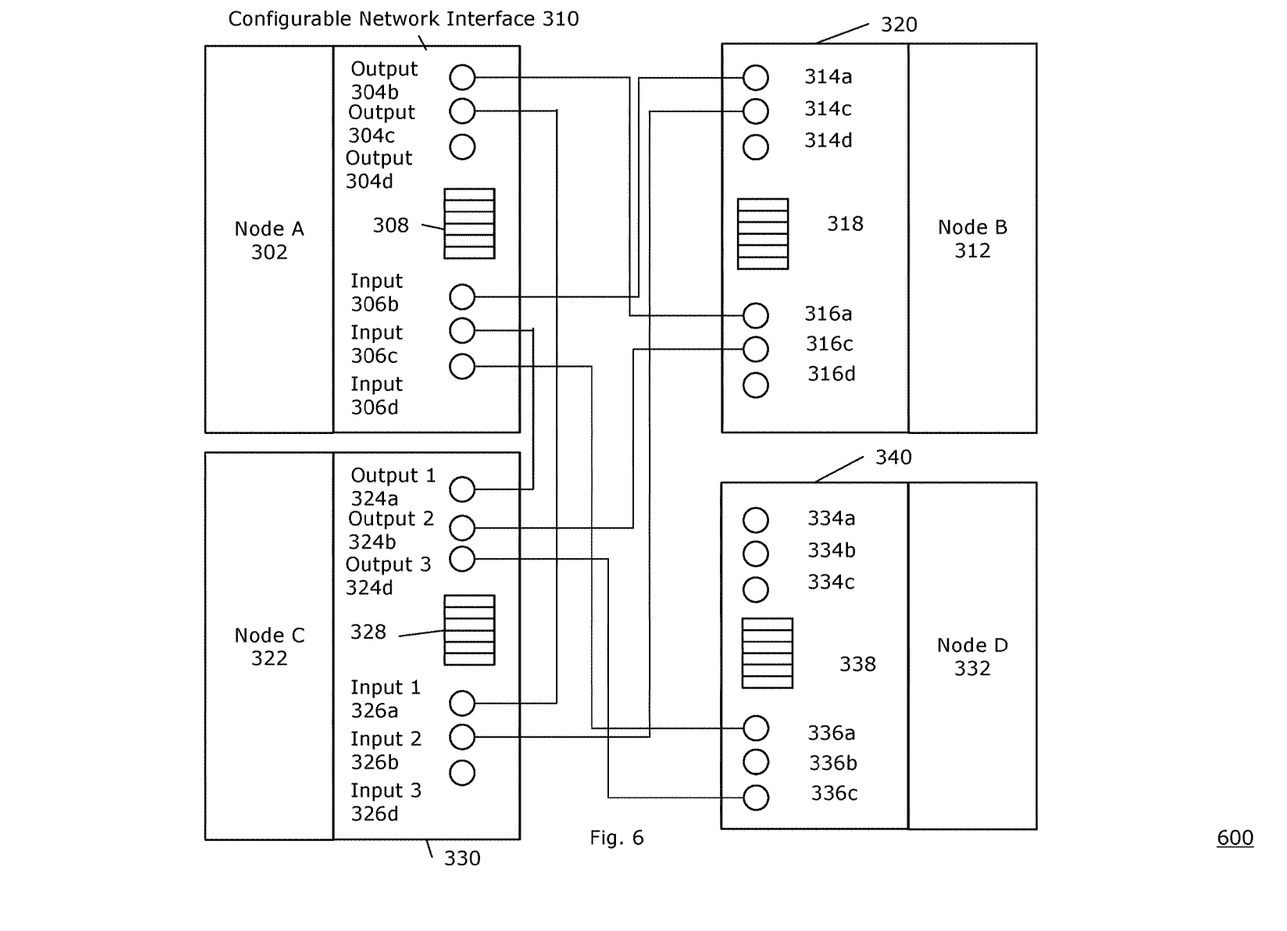
FIG. 6 is a diagram illustrating an example embodiment of a triplex using the configurable interface of the present invention.

FIG. 6 is a diagram 600 illustrating an example embodiment of a triplex using the configurable interface of the present invention. While the four nodes 302, 312, 322, and 332 shown in FIG. 3 are shown in FIG. 6, several connectors are missing. For example Node D 332 receives no output signals from Node A 302, Node B 312, or Node C 322, and Node D 332 does not output to Node B 312. Therefore, assuming all nodes are operating correctly internally, Nodes A-C 302, 312, and 322 form a triplex, where Node D 332 is excluded from the self-forming fault-tolerant operational group.

Figure 7:
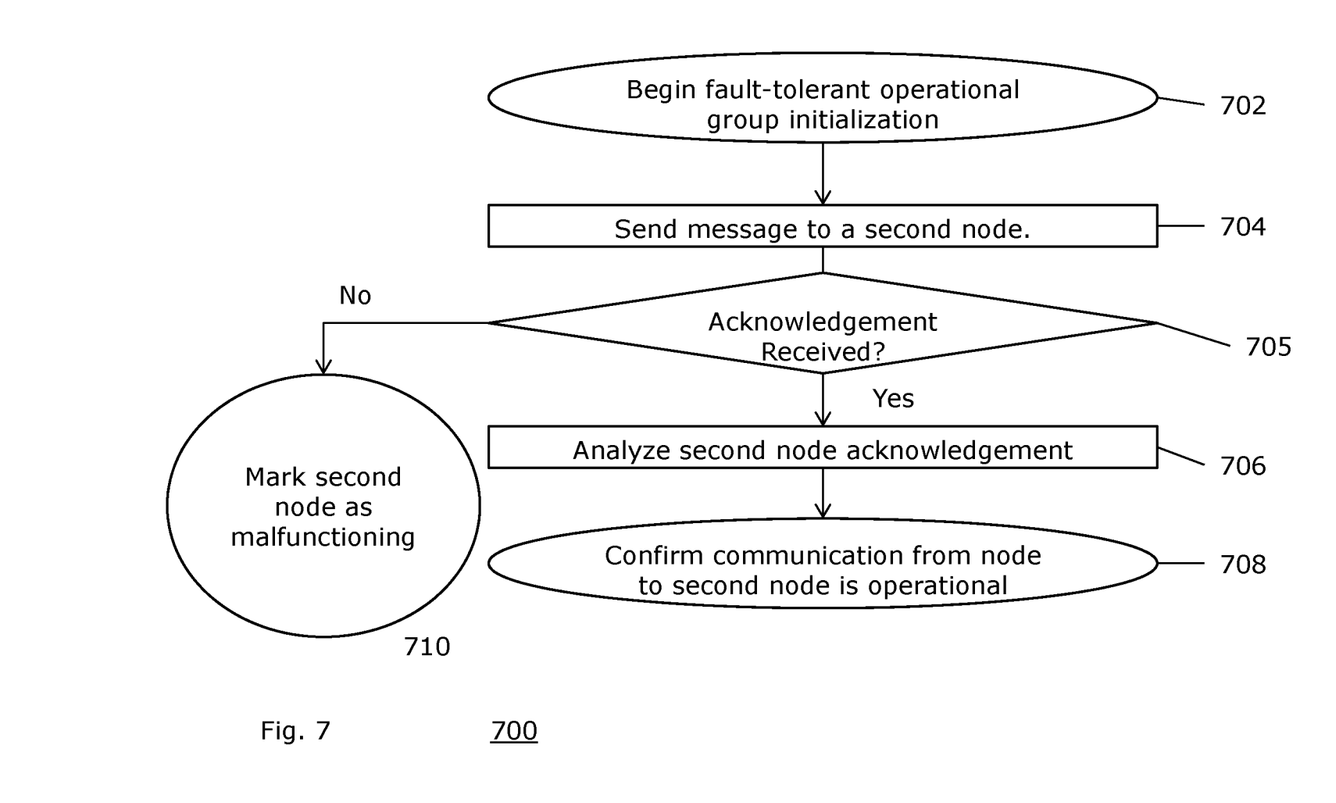
FIG. 7 is a flow diagram illustrating an example embodiment of a process employed by the present invention.

FIG. 7 is a flow diagram 700 illustrating an example embodiment of a process employed by the present invention. The '772 patent describes forming a Quad, Triplex, and Duplex, but not Simplex; however, in the '772 patent, the nodes are not provided pre-information as to which level of fault-tolerance to expect from the operational group. The process illustrated by the diagram 700 of embodiments of the present invention, determines, via node to node communication, which nodes are healthy, and thereby form the fault-tolerant operational group. In other words, if only three of four nodes are healthy, a triplex is formed. To efficiently accommodate a modular design, each node is provided pre-information as to what kind of configuration is expected (e.g., from the switch banks described above). However, if the pre-information provided indicates that a triplex is to be formed, and the third node is not operating or communicating correctly, then a duplex is formed. On the other hand, if the pre-information provided indicates that a triplex is to be formed, and a fourth node is connected, a triplex is still formed. The fourth node is ignored, and a quad is not formed. In other words, the pre-information overrides the node network setup when the amount of nodes is greater than the amount of nodes indicated in the pre-information, but the pre-information is overridden when the amount of nodes is fewer than the amount of nodes indicated in the pre-information.

After power or reset, the process illustrated in flow diagram 700 begins. The process is an initialization sequence that verifies communication and correct operation with another node. First, a node begins the fault-tolerant operational group initialization (702). The initialization can be done concurrently at other nodes, or in sequence. The initialization can be begun by a power-on reset circuit. The power-on reset circuit is configured to have a "low" signal (binary 0), and then release an on signal upon initialization. A person of ordinary skill in the art can recognize that different types of signals can be employed, but that whichever type of signal is employed, the initialization is triggered by a change in that signal.

Upon power on, a hardware signal is generated in a node when it receives the reset signal. Before this signal, the node operates in an off state (e.g., State 0), but leaves the off state when the reset signal is received. After the reset signal, each node initializes itself through several states. For example, it reads the configuration bits, such as which channel the node is configured to be, and the type of intended operational group. After initializing itself, it begins a loop communicating with other nodes to self-realize the fault-tolerant operational group.

The node beginning the initialization, which is referred to as Node A in this example, selects a second node, which is referred to as Node B in this example, to send a message to (704). The respective communication drivers of Node A and Node B enter into a phase locked loop (PLL). Each node is aware when its clock is being set, and when data is being sent. Each Node, further, includes a fault-tolerant clock (FTC), such that each node's clock is synchronized within a degree of tolerance. Multiple messages can also be sent (e.g., a multicast or a broadcast). In such a case, after the messages are sent to all nodes in the operational group, the sending node (e.g., Node A) checks for acknowledgments from the other nodes sequentially (e.g., Node B, Node C, and Node D). A person of ordinary skill in the art could also configure the system to check for acknowledgements in parallel. Once Node A realizes that it can communicate with Node B, it can begin confirming communication with another node.

In response to receiving the message, Node B sends Node A an acknowledgement. If the acknowledgment is received (705), Node A analyzes the acknowledgement (706) and confirms communication from node to second node is operational (708). A person of ordinary skill in the art can recognize that multiple messages and multiple acknowledgments can be sent and received for each node to increase the confidence the nodes and communication channels are operational.

This process can then repeats with other nodes sending out messages in a similar manner to the rest of the fault-tolerant operational group. Once all nodes are confirmed to be connected to each other, the fault-tolerant operational group begins running.

Figure 8:
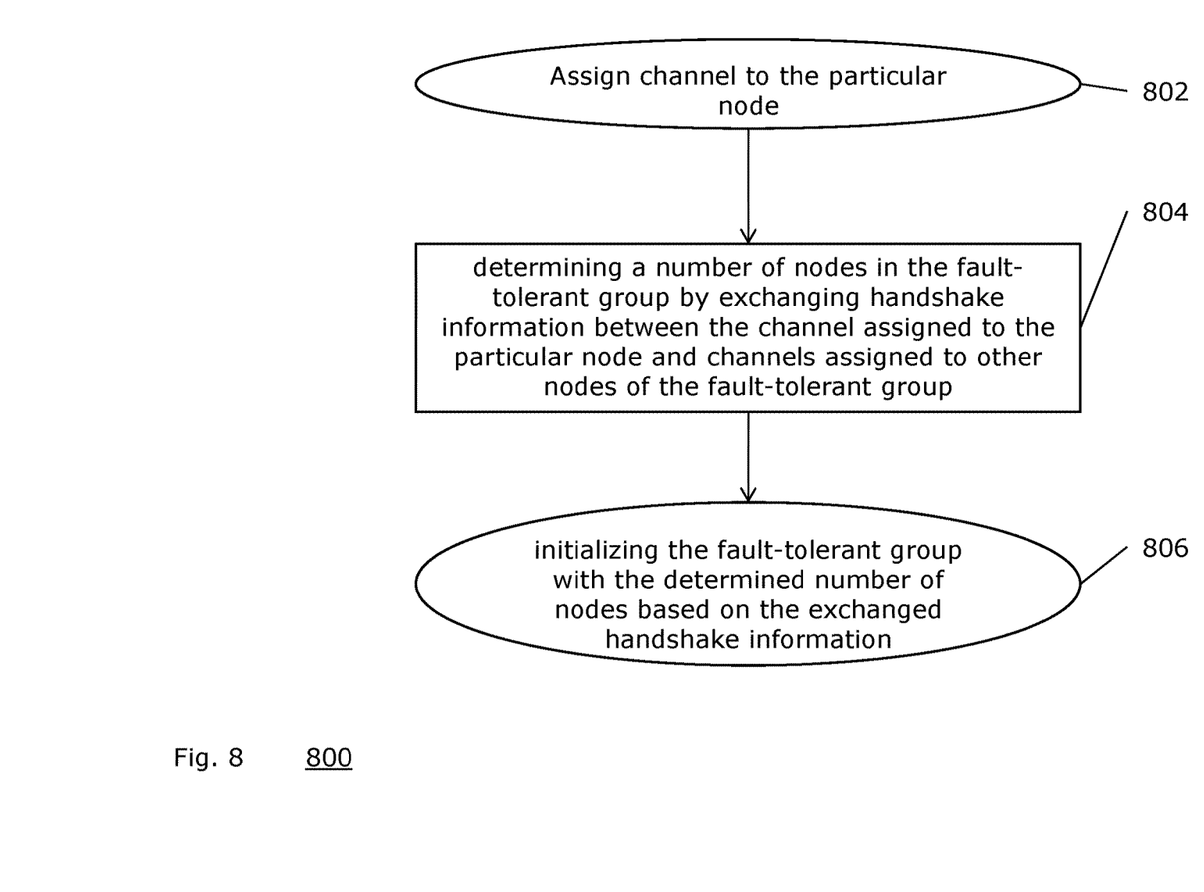
FIG. 8 is a flow diagram illustrating an example embodiment of a process employed by the present invention.

FIG. 8 is a flow diagram 800 illustrating an example embodiment of a process employed by the present invention. The method first assigns, based on a switch module of a particular node of one or more nodes of a fault-tolerant group, a channel to the particular node (802). In relation to FIG. 3, the switch module can perform the above described function of the switch bank(s) 308, 318, 328, and 338, or assign channel identification via firmware, load channel identification stored in a memory, or determine channel identification through hard wired signals on the backplane (e.g., via a resistor to ground, short to ground, resistor to voltage, or a short to voltage) or the node itself (e.g., via a resistor to ground, short to ground, resistor to voltage, or a short to voltage). In relation to FIG. 8, the method determines a number of nodes in the fault-tolerant group by exchanging handshake information between the channel assigned to the particular node and channels assigned to other nodes of the fault-tolerant group (804). Exchanging handshake information is further described above in relation to FIG. 7. In relation to FIG. 8, the method initializes the fault-tolerant group with the determined number of nodes based on the exchanged handshake information (806).

Figure 9:
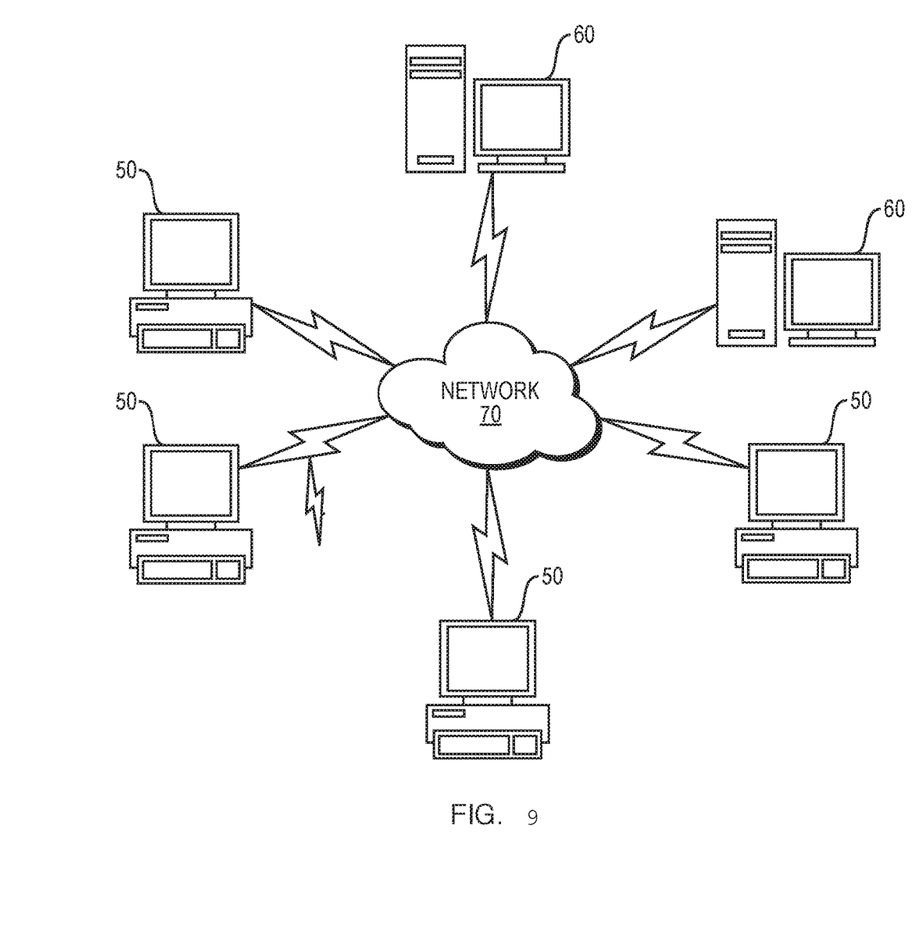
FIG. 9 illustrates a computer network or similar digital processing environment in which embodiments of the present invention may be implemented.

FIG. 9 illustrates a computer network or similar digital processing environment in which embodiments of the present invention may be implemented.

Client computer(s)/devices 50 and server computer(s) 60 provide processing, storage, and input/output devices executing application programs and the like. The client computer(s)/devices 50 can also be linked through communications network 70 to other computing devices, including other client devices/processes 50 and server computer(s) 60. The communications network 70 can be part of a remote access network, a global network (e.g., the Internet), a worldwide collection of computers, local area or wide area networks, and gateways that currently use respective protocols (TCP/IP, Bluetooth®, a registered trademark of Bluetooth SIG, Inc., etc.) to communicate with one another. Other electronic device/computer network architectures are suitable.

Figure 10:
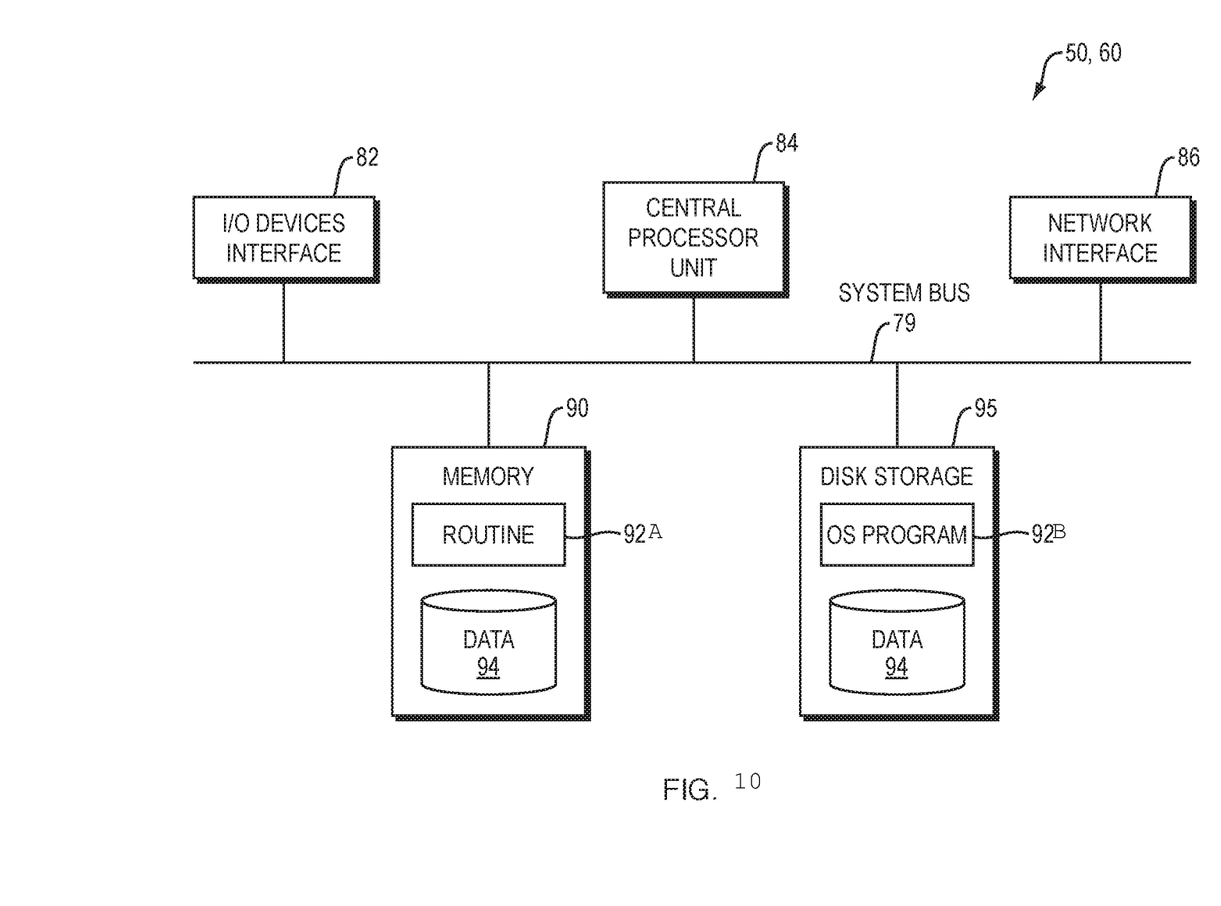
FIG. 10 is a diagram of an example internal structure of a computer (e.g., client processor/device or server computers) in the computer system of FIG. 9.

FIG. 10 is a diagram of an example internal structure of a computer (e.g., client processor/device 50 or server computers 60) in the computer system of FIG. 9. Each computer 50, 60 contains a system bus 79, where a bus is a set of hardware lines used for data transfer among the components of a computer or processing system. The system bus 79 is essentially a shared conduit that connects different elements of a computer system (e.g., processor, disk storage, memory, input/output ports, network ports, etc.) that enables the transfer of information between the elements. Attached to the system bus 79 is an I/O device interface 82 for connecting various input and output devices (e.g., keyboard, mouse, displays, printers, speakers, etc.) to the computer 50, 60. A network interface 86 allows the computer to connect to various other devices attached to a network (e.g., network 70 of FIG. 9). Memory 90 provides volatile storage for computer software instructions 92 and data 94 used to implement an embodiment of the present invention (e.g., terminator device, fault-tolerant operational block, and node code detailed above). Disk storage 95 provides non-volatile storage for computer software instructions 92 and data 94 used to implement an embodiment of the present invention. A central processor unit 84 is also attached to the system bus 79 and provides for the execution of computer instructions.

In one embodiment, the processor routines 92 and data 94 are a computer program product (generally referenced 92), including a non-transitory computer-readable medium (e.g., a removable storage medium such as one or more DVD-ROM's, CD-ROM's, diskettes, tapes, etc.) that provides at least a portion of the software instructions for the invention system. The computer program product 92 can be installed by any suitable software installation procedure, as is well known in the art. In another embodiment, at least a portion of the software instructions may also be downloaded over a cable communication and/or wireless connection. In other embodiments, the invention programs are a computer program propagated signal product embodied on a propagated signal on a propagation medium (e.g., a radio wave, an infrared wave, a laser wave, a sound wave, or an electrical wave propagated over a global network such as the Internet, or other network(s)). Such carrier medium or signals may be employed to provide at least a portion of the software instructions for the present invention routines/program 92.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A method comprising:
    assigning, based on network connections at a switch module of a particular node of one or more nodes of a fault-tolerant group, a network channel to the particular node;
    determining a number of nodes in the fault-tolerant group by exchanging handshake information between the network channel assigned to the particular node and network channels assigned to other nodes of the fault-tolerant group; and
    initializing the fault-tolerant group with the determined number of nodes based on the exchanged handshake information;
    wherein each node of the fault-tolerant group is configured to perform a same function, and the nodes of the fault-tolerant group compare output of each node for the same function to generate an output for the fault-tolerant group, the generated output for the fault-tolerant group being one of the outputs of a node of the fault-tolerant group.

2. The method of claim 1, wherein determining the number of nodes in the fault-tolerant group is set by at least one switch of the switch module.

3. The method of claim 1, wherein exchanging handshake information further includes:
    sending one or more messages from the network channel from the particular node to the network channel of a second node of the fault-tolerant group;
    if a response to the messages is received at the particular node, marking the network channel as active; and
    determining the level of fault-tolerance based on the number of nodes in the fault-tolerant group.

4. The method of claim 3, wherein determining the level of fault-tolerance is further based on determining a number of nodes operatively connected to the one or more nodes through the network channels marked as active.

5. The method of claim 1, further comprising presenting, to a user, the level of fault-tolerance for approval.

6. The method of claim 1, wherein determining the number of nodes in the fault-tolerant group includes receiving one or more termination signals along one or more unused network channels, and determining the number of nodes in the fault-tolerant group to be the number of nodes that receive signals other than the termination signal.

7. The method of claim 6, wherein the one or more network channels correspond with ports, and the one or more network channels are in a sequential order, and further comprising:
    providing the one or more termination signals by connecting a termination device to one of the ports.

8. The method of claim 7, wherein:
    providing the one or more termination signals includes providing a termination signal at one of the ports; and
    determining the number of nodes in the fault-tolerant group includes determining the number of nodes corresponding to network channels before the termination device in reference to the sequential order of the ports.

9. The method of claim 7, wherein providing the one or more termination signals includes providing a termination signal at any unused port, and determining the number of nodes in the fault-tolerant group includes determining the number of nodes corresponding to network channels disconnected from the termination device.

10. A system comprising:
a fault-tolerant group including:
one or more nodes;
a switch module of a particular node of the one or more nodes configured to assign a network channel to the particular node based on network connections at the switch module of the particular node;
wherein the fault-tolerant group is configured to automatically self-configure by:
determining a number of nodes in the fault-tolerant group by exchanging handshake information between the network channel assigned to the particular node and network channels assigned to other nodes of the fault-tolerant group, and
initializing the fault-tolerant group with the determined number of nodes based on the exchanged handshake information;
wherein each node of the fault-tolerant group is configured to perform a same function, and the nodes of the fault-tolerant group compare output of each node for the same function to generate an output for the fault-tolerant group, the generated output for the fault-tolerant group being one of the outputs of a node of the fault-tolerant group.

11. The system of claim 10, wherein determining the number of nodes in the fault-tolerant group is set by at least one switch of the switch module.

12. The system of claim 10, wherein exchanging handshake information further includes:
sending one or more messages from the network channel from the particular node to the network channel of a second node of the fault-tolerant group;
if a response to the messages is received at the particular node, marking the network channel as active; and
determining the level of fault-tolerance based on the number of nodes in the fault-tolerant group.

13. The system of claim 12, wherein determining the level of fault-tolerance is further based on determining a number of nodes operatively connected to the one or more nodes through the network channels marked as active.

14. The system of claim 10, further comprising a display configured to present, to a user, the level of fault-tolerance for approval.

15. The system of claim 10, wherein determining the number of nodes in the fault-tolerant group includes receiving one or more termination signals along one or more unused network channels, and determining the number of nodes in the fault-tolerant group to be the number of nodes that receive signals other than the termination signal.

16. The system of claim 15, wherein the one or more network channels correspond with ports, and the one or more network channels are in a sequential order, and further comprising:
a termination device configured to connect to one of the ports and to provide the one or more termination signals.

17. The system of claim 16, wherein:
the termination device is further configured to provide the one or more termination signals includes providing a termination signal at one of the ports; and
the fault-tolerant group is further configured to determine the number of nodes in the fault-tolerant group includes determining the number of nodes corresponding to network channels before the termination device in reference to the sequential order of the ports.

18. The system of claim 16, wherein providing the one or more termination signals includes providing a termination signal at any unused port, and
determining the number of nodes in the fault-tolerant group includes determining the number of nodes corresponding to network channels disconnected from the termination device.

19. A non-transitory computer-readable medium configured to store instructions for a fault-tolerant group, the instructions, when loaded and executed by a processor, causes the processor to:
assign, based on network connections at a switch module of a particular node of one or more nodes of a fault-tolerant group, a network channel to the particular node; and
automatically self-configure the fault tolerant group by:
determining a number of nodes in the fault-tolerant group by exchanging handshake information between the network channel assigned to the particular node and network channels assigned to other nodes of the fault-tolerant group, and
initializing the fault-tolerant group with the determined number of nodes based on the exchanged handshake information;
wherein each node of the fault-tolerant group is configured to perform a same function, and the nodes of the fault-tolerant group compare output of each node for the same function to generate an output for the fault-tolerant group, the generated output for the fault-tolerant group being one of the outputs of a node of the fault-tolerant group.

20. The non-transitory computer-readable medium of claim 19, wherein determining the number of nodes in the fault-tolerant group is set by at least one switch of the switch module.

* * * * *